(12) United States Patent
Lin et al.

(10) Patent No.: US 11,572,087 B2
(45) Date of Patent: Feb. 7, 2023

(54) RADAR MONITORING SYSTEM FOR TRAFFIC CONTROL AND METHOD THEREOF

(71) Applicant: CUBTEK INC., Hsinchu County (TW)

(72) Inventors: Yu-Jen Lin, Hsinchu County (TW);
Guo-Hao Syu, Hsinchu County (TW);
Shih-Ming Chang, Hsinchu County (TW)

(73) Assignee: CUBTEK INC., Hsinchu County (TW)

( * ) Notice: Subject to any disclaimer, the term of this patent is extended or adjusted under 35 U.S.C. 154(b) by 126 days.

(21) Appl. No.: 17/225,807

(22) Filed: Apr. 8, 2021

(65) Prior Publication Data
US 2022/0324496 A1    Oct. 13, 2022

(51) Int. Cl.
*B61L 23/00*    (2006.01)
*G01S 13/93*    (2020.01)

(52) U.S. Cl.
CPC ............ *B61L 23/007* (2013.01); *G01S 13/93* (2013.01)

(58) Field of Classification Search
CPC ............................... B61L 23/007; G01S 13/93
See application file for complete search history.

(56) References Cited

U.S. PATENT DOCUMENTS

| | | | |
|---|---|---|---|
| 2009/0174573 A1* | 7/2009 | Smith ................. | G08G 1/0962 340/905 |
| 2015/0323663 A1 | 11/2015 | Lehnertz | |
| 2017/0309174 A1* | 10/2017 | Gonzales ................. | G08G 1/09 |
| 2019/0001885 A1* | 1/2019 | Hathaway ............ | G08G 1/0955 |

* cited by examiner

*Primary Examiner* — Daryl C Pope
(74) *Attorney, Agent, or Firm* — Muncy, Geissler, Olds & Lowe, P.C.

(57) ABSTRACT

A radar monitoring system and a radar monitoring method for monitoring a traffic control zone involve installing two radars near the traffic control zone so that the radars emit radar waves covering the traffic control zone and serve as backups for each other; locating any object in the traffic control zone as a coordinate point with respect to a set of X and Y coordinate axes, and subjecting the X and Y coordinate axes of the two radars to axial normalization, so that an identical object in the traffic control zone is located by the first radar and the second radar at approximately the same coordinate point. An alert area is defined in the traffic control zone and an excluded area around a resident facility in the traffic control zone is excluded from the alert area. When an object in the alert area is determined as an obstacle, an alert is triggered.

13 Claims, 12 Drawing Sheets

RADAR MONITORING SYSTEM FOR TRAFFIC CONTROL AND METHOD THEREOF

BACKGROUND OF THE INVENTION

1. Field of the Invention

The present invention relates to the radar technology, and more particularly to a radar monitoring system for traffic control and a radar motoring method thereof.

2. Description of the Related Art

Control zones are often set up around intersections of railways and/or roads for traffic safety. For example, a control zone can often be setup at a grade crossing and equipped with an alert unit so that when there is a vehicle or an obstacle improperly stays in the control zone, an emergency button of the alert unit can be manually pushed to warn a driver of an approaching train to take necessary emergency measures. Nevertheless, serious accidents may still happen if the emergency button is not triggered timely. Additionally or alternatively, automatic detection technologies may be used. For example, a conventional camera-based system may be used to detect whether there is any vehicle or pedestrian in the monitored control zone and trigger an alter if the detection result is positive. This known approach, however, tends to have its accuracy degraded in the event of low visibility. As another example, a thermal imager may be used for automatic obstacle detection, but it becomes useless when the present obstacle is an object with on heat sources. Hence, this device is less reliable for the applications mentioned herein.

US Patent Application Publication No. 20150323663A1 discloses a device and a method for danger zone monitoring to be used at a grade crossing. The prior-art disclosure uses a radar sensor installed at the grade crossing to detect and identify traffic paths of passing objects, thereby ascertaining the danger zone to be monitored with the aid of radar reflections of closed barriers. However, in addition to these barriers, Jersey barriers, emergency button machines, and other stationary or moving facilities (hereinafter collectively referred to as "resident facilities") are also objects often being provided at a grade crossing. The prior-art disclosure employs a single radar sensor without any backups and provides no means to eliminate interference raised from stationary and/or moving resident facilities existing in the danger zone, making it less accurate in terms of obstacle detection.

SUMMARY OF THE INVENTION

To address the aforementioned issues, the present invention provides a radar monitoring system for traffic control and its monitoring method, serving to detect any obstacle in a traffic control zone and trigger an alert in response to a positive detection result.

One embodiment of the present invention provides a radar monitoring system, for monitoring a traffic control zone at a grade crossing or at an intersection of roads. The radar monitoring system comprises a radar detecting unit, a coordinate conversion unit, and an alert processing unit. The radar detecting unit includes a first radar and a second radar that are installed in or near the traffic control zone so as to emit radar waves covering the traffic control zone and serve as backups for each other. The first radar and the second radar each define the traffic control zone using a coordinate system. The traffic control zone contains an excluded area set around a resident facility. The coordinate conversion unit is coupled to the radar detecting unit for converting the coordinate systems into rectangular coordinate systems, so that each of the first and second radars is able to locate any object in the traffic control zone at a coordinate point with respect to a set of X and Y coordinate axes. The X and Y coordinate axes associated with the first radar and the second radar are then subject to axial normalization, so that an identical object in the traffic control zone is located by the first radar and the second radar at approximately the same coordinate point. The alert processing unit is coupled to the radar detecting unit and the coordinate conversion unit, and is linked to an alert area contained in the traffic control zone, so that when an object in the alert area is determined as an obstacle, the alert processing unit triggers an alert.

One embodiment of the present invention provides a radar monitoring method, for monitoring a traffic control zone at a grade crossing or at an intersection of roads. The method comprises steps of radar installation, coordinate conversion, alert-area setup, as well as determination and alert. Therein, the step of radar installation involves installing a first radar and a second radar in or near the traffic control zone so that the first and second radars emit radar waves covering the traffic control zone and serve as backups for each other, the first radar and the second radar each defining the traffic control zone using a coordinate system, and the traffic control zone containing an excluded area set around a resident facility. The step of coordinate conversion involves converting the coordinate systems into rectangular coordinate systems, so that each of the first and second radars is able to locate any object in the traffic control zone at a coordinate point with respect to a set of X and Y coordinate axes, wherein the X and Y coordinate axes associated with the first radar and the second radar are subject to axial normalization, so that an identical object in the traffic control zone is located by the first radar and the second radar at approximately the same coordinate point. The step of alert-area setup involves defining an alert area in the traffic control zone. The step of determination and alert involves when an object in the alert area is determined as an obstacle, triggering an alert.

Thereby, the first radar and the second radar installation having their X and Y coordinate axes normalized can locate the same object at approximately the same coordinate point and serve as backups for each other. Additionally, by dividing the traffic control zone into the alert area and the excluded area, obstacles such as pedestrians, animals or other objects can be accurately differentiated from resident facilities such as boom barriers or Jersey barriers and properly trigger alerts. The present invention thus provides accurate obstacle detection and automatic alerting despite any resident facility in the traffic control zone.

DETAILED DESCRIPTION OF THE INVENTION

In order to better explain the conception of the present invention, some embodiments are provided below. In accompanying drawings, elements of these embodiments may not be depicted in their actual scales. Instead, they may in the drawings have scales, sizes, deformation and/or displacement that are favorable to exhibit the features of the present invention.

Referring to FIG. 1 through FIG. 12, the present invention provides a radar monitoring system 100 and its method 200. The radar monitoring system 100 is configured to be installed in or near an intersection of railways and/or roads and work with the radar monitoring method 200 to scan a traffic control zone 300. The intersection herein refers to a grade crossing at an intersection of a railway 400 and a road 500, for example. The traffic control zone 300 is defined in the intersection, and has a lengthwise rectangular shape in the present embodiment. However, the present invention is not limited thereto. For example, when the railway 400 and the road 500 are not perpendicular to each other, the traffic control zone may be defined at their intersection in any suitable shape.

Figure 1:
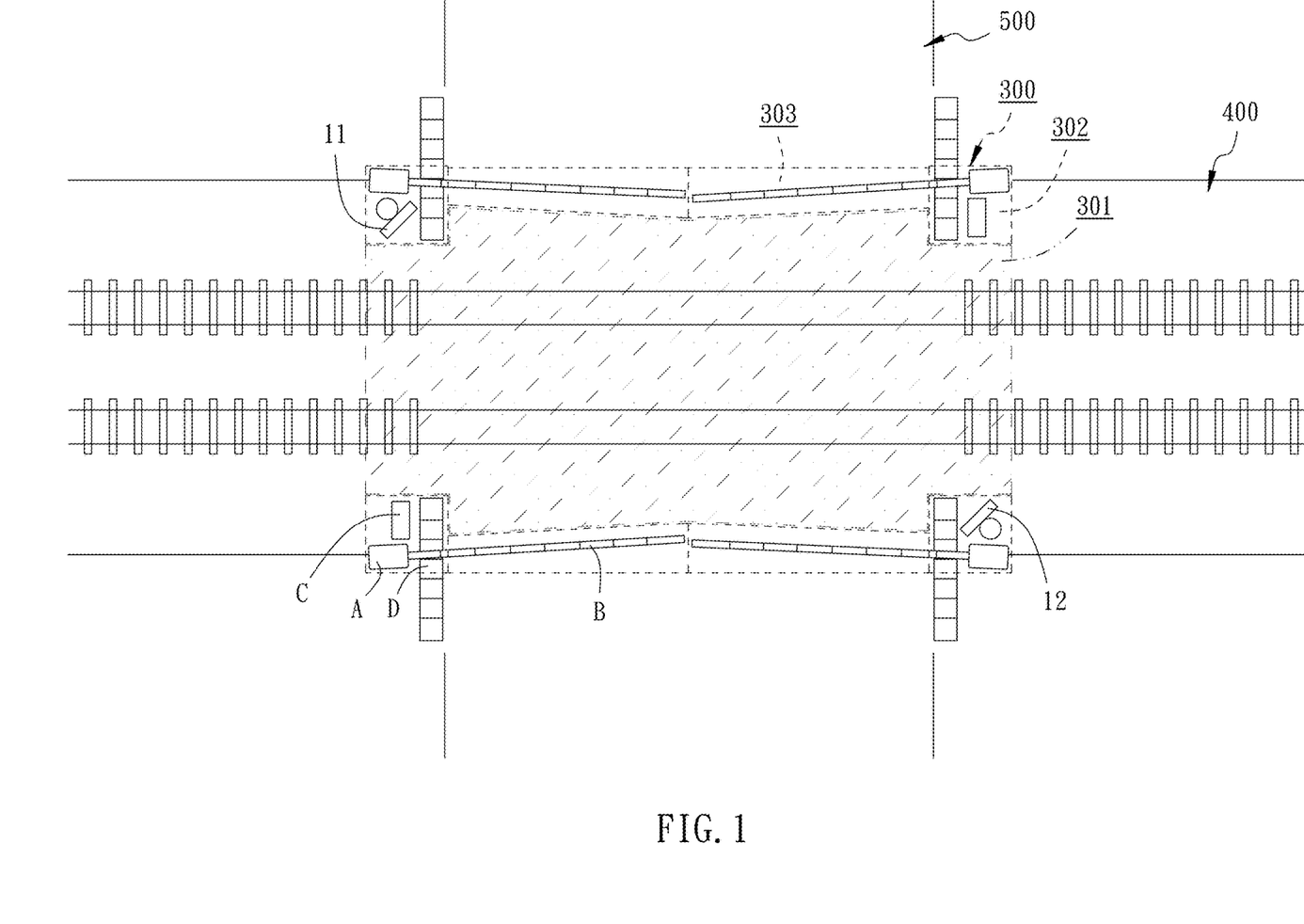
FIG. 1 is an applied view of a radar monitoring system according to a first embodiment of the present invention, showing a first radar and a second radar installed diagonally in a traffic control zone at a grade crossing and opposite to each other, wherein the traffic control zone contains an alert area and some excluded areas.
Figure 2:
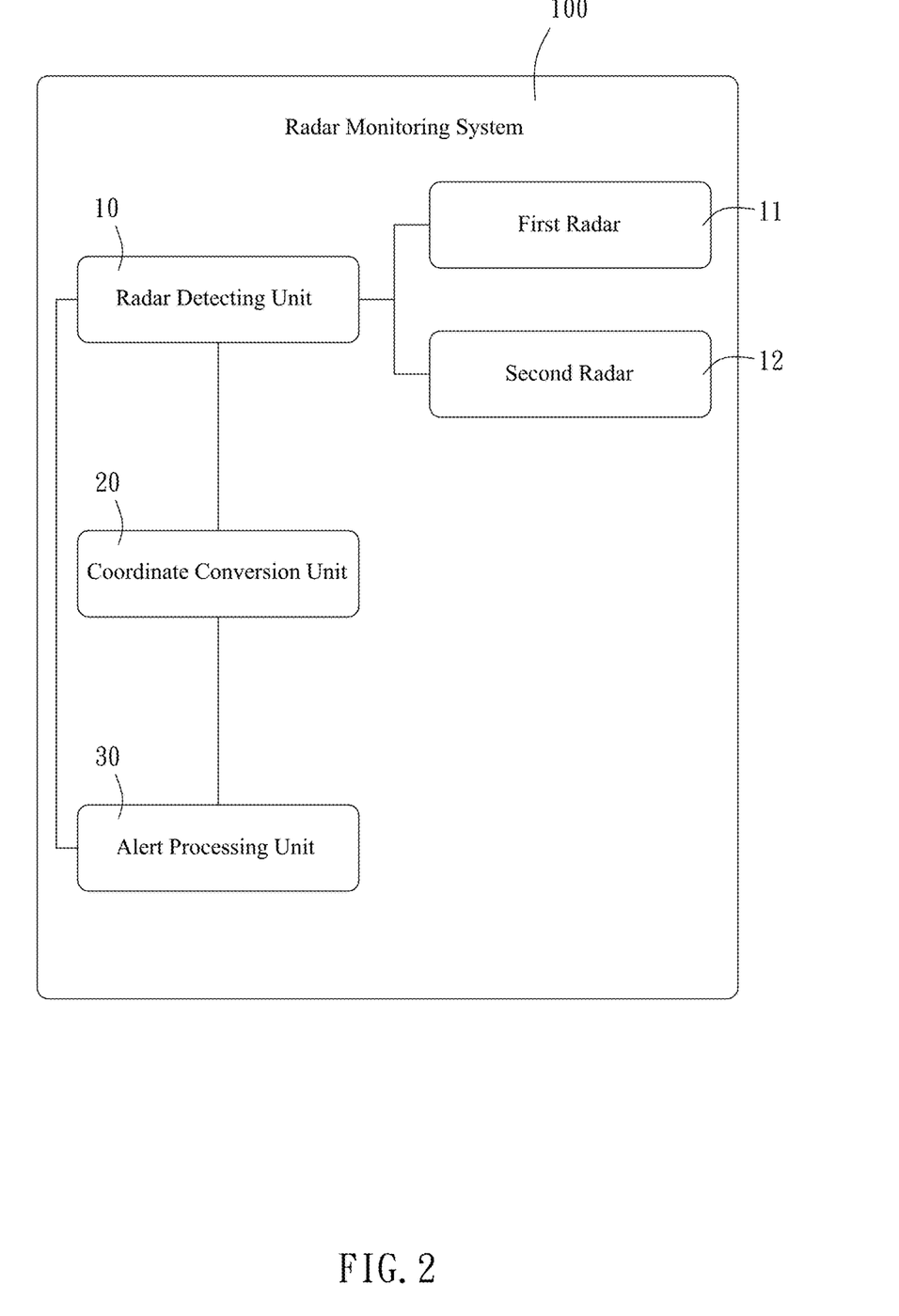
FIG. 2 is a block diagram of the radar monitoring system of the first embodiment of the present invention.

The radar monitoring system 100, as shown in FIG. 2, comprises a radar detecting unit 10, a coordinate conversion unit 20, and an alert processing unit 30. The radar detecting unit 10 includes a first radar 11 and a second radar 12 installed in the grad crossing (as shown in FIG. 1). The first radar 11 and the second radar 12 emit radar waves to cover the traffic control zone 300. In the case that any of the first radar 11 and the second radar 12 has its detection range blocked by an obstacle, such as a pedestrian, an animal, a motorcycle, or a car, present in the traffic control zone 300, the other of the first radar 11 and the second radar 12 can work as a backup that ensures functionality of the system. In a first embodiment of the present invention, there are one first radar 11 and one second radar 12, and each of which is a short-range radar. The coordinate conversion unit 20 is coupled to the radar detecting unit 10, and the alert processing unit 30 is coupled to the radar detecting unit 10 and the coordinate conversion unit 20. The coordinate conversion unit 20 and alert processing unit 30 as described herein may be implemented using a terminal device, such as a computer system.

Figure 3:
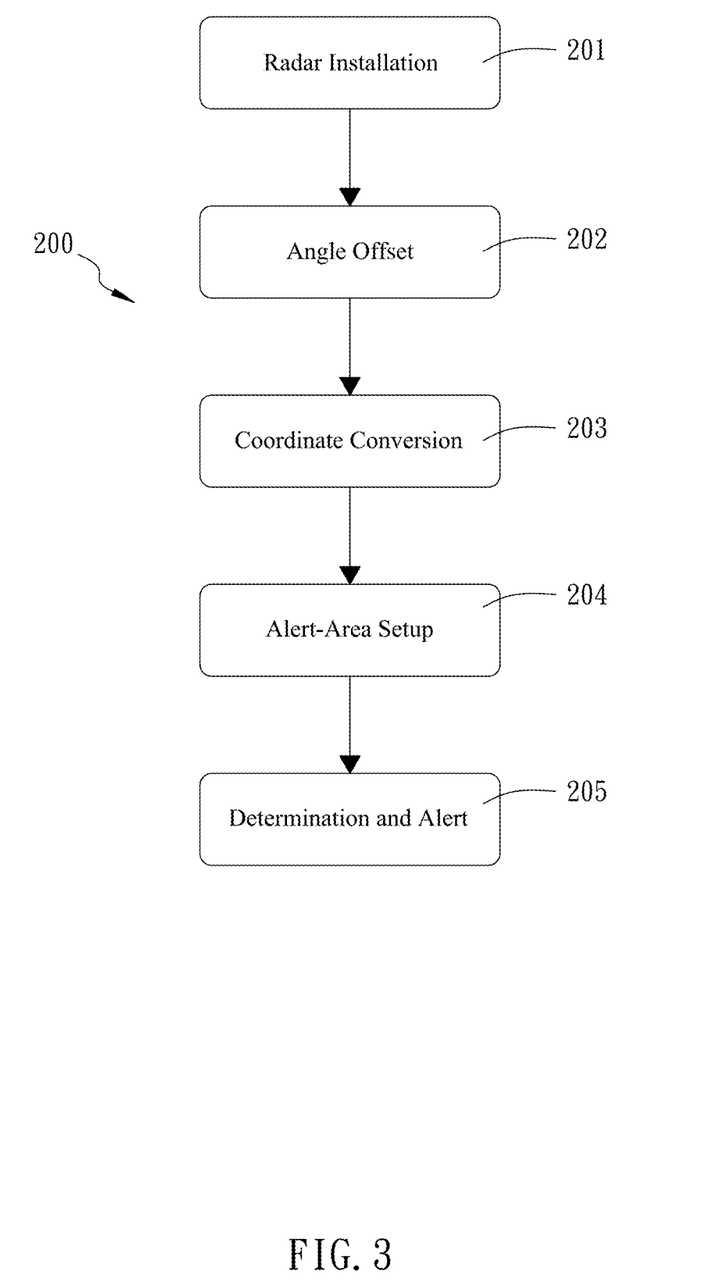
FIG. 3 is a flowchart of a radar monitoring method according to one embodiment of the present invention.

The radar monitoring method 200, as shown in FIG. 3, comprises steps of radar installation 201, angle offset 202, coordinate conversion 203, alert-area setup 204, and determination and alert 205 in the present embodiment to be performed successively.

Figure 4A:
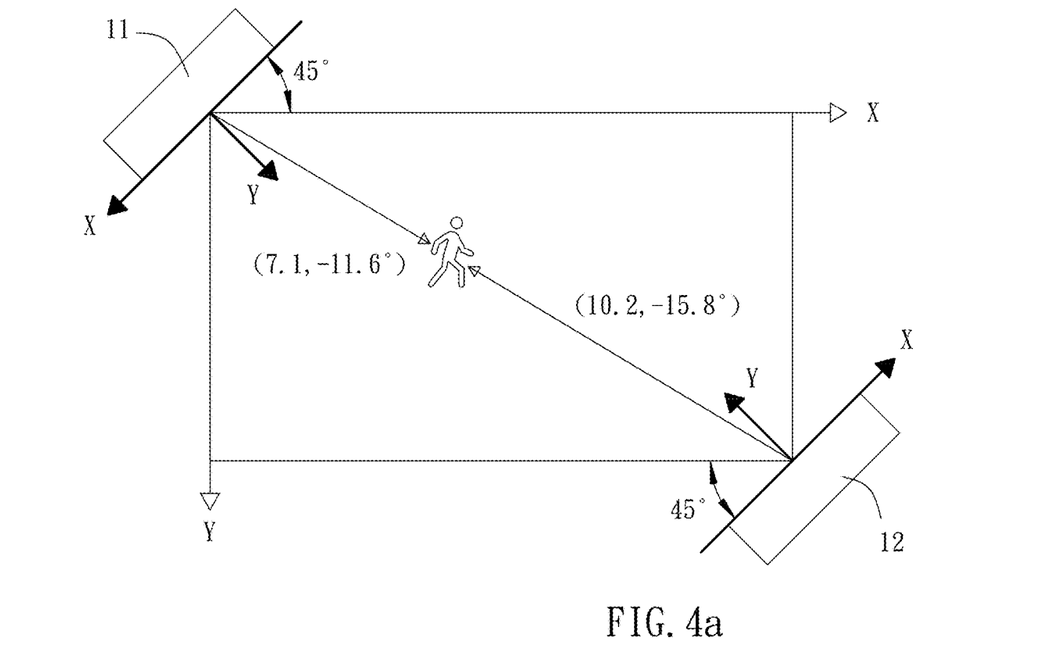
FIG. 4a is a schematic illustration of the first embodiment of the present invention, showing that the first and second radars are opposite to each other at a rectangular traffic control zone for detecting a pedestrian, where in each of the first and second radars is posed at 45° from an adjacent edge of the traffic control zone.

The step of radar installation 201, as shown in FIG. 1, involves installing the first radar 11 and the second radar 12 at the intersection for scanning the traffic control zone 300 that is roughly in a lengthwise rectangular shape in the present embodiment. The first radar 11 and the second radar 12 in the present embodiment are diagonally arranged in the traffic control zone 300 to emit radar waves in directions opposite to each other. They emit radar waves covering the traffic control zone 300 and serve as backups for each other. The first radar 11 and the second radar 12 each define the traffic control zone 300 using a coordinate system (such as a Cartesian coordinate system, a spherical coordinate system, a homogeneous coordinate system, a polar coordinate system, etc., but not including a rectangular coordinate system). One or more excluded areas are defined around one or more resident facilities existing in the traffic control zone 300. In an example where the coordinate system is a polar coordinate system, any location in the traffic control zone 300 may be represented by a set of polar coordinates, namely a radius coordinate r and an angle coordinate θ, and written as (r, θ). As shown in FIG. 4a, there is a pedestrian walking in the traffic control zone 300. When the pedestrian is detected by the first radar 11 and the second radar 12, respectively, the present location of the pedestrian as detected by the first radar 11 is represented by (7.1, −11.6°), or (10.2, −15.8°) as detected by the second radar 12. In FIG. 4a, the first radar 11 and the second radar 12 are opposite to each other and each posed at 45° from an adjacent edge of the traffic control zone 300.

Figure 4B:
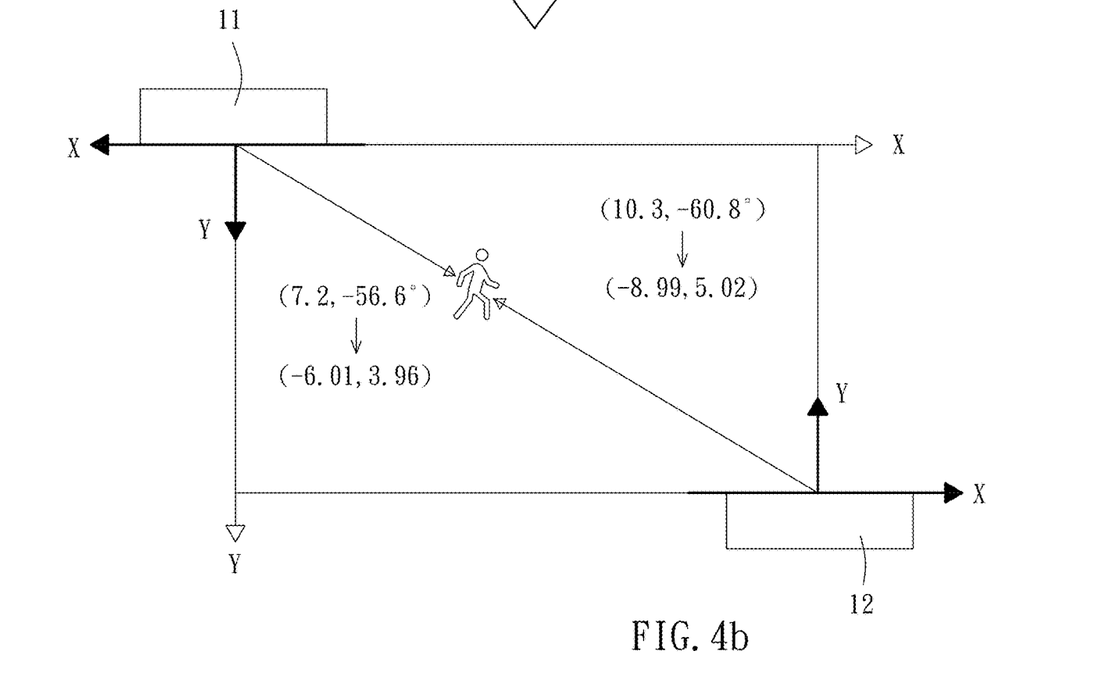
FIG. 4b is similar to FIG. 4a, showing the first and second radars subject to pseudo offset with respect to X and Y coordinate axes and becoming aligned with the edges of the traffic control zone for axial normalization

The step of angle offset 202 follows the steps of radar installation 201, and involves offsetting an angle of arrival (AOA) of each of the first radar 11 and the second radar 12. As shown in FIG. 4b, in the present embodiment, the step is performed by rotating each of the first radar 11 and the second radar 12 clockwise for 45° with respect to the adjacent edge of the traffic control zone 300. It is to be noted that the first radar 11 and the second radar 12 are not physically rotated, but having their AOAs rotated for 45° in a pseudo-offset manner. After the step of angle offset 202, the polar coordinates of the pedestrian become (7.2, −56.6°) as detected by the first radar 11, and (10.3, −60.8°) as detected by the second radar 12. At this time, the first radar 11 and the second radar 12 are aligned with the X and Y coordinate axes used to define the traffic control zone 300.

The step of coordinate conversion 203 follows the step of angle offset 202, and involves converting the polar coordinates into corresponding rectangular coordinates in the present embodiment to locate an object with a coordinate point with respect to the X and Y coordinate axes, and normalizing the X and Y coordinate axes for the first radar 11 and the second radar 12. The conversion from polar coordinates to rectangular coordinates is performed by the coordinate conversion unit 20. Therein, the X coordinate value is obtained using the equation: $x=r^* \sin(\theta)$, and the Y coordinate value is obtained using the equation: $y=r^* \cos(\theta)$. After the step of angle offset 202 and the step of coordinate conversion 203, axial normalization of the X and Y coordinate axes for the first radar 11 and the second radar 12 is accomplished. In the present embodiment, a first initial coordinate point (0, 0) for the first radar 11 and a second initial coordinate point (15, 9) for the second radar 12 are further defined. The first radar 11 detects the object and obtains a first actual coordinate point, while the second radar 12 detects the same object and obtains a second actual coordinate point. The first actual coordinate point and the second actual coordinate point each represent the location of the pedestrian in FIG. 4b. Arrows in FIG. 4b indicate the conversion form polar coordinates to rectangular coordinates. The first actual coordinate point is (−6.01, 3.96) system, and the second actual coordinate point is (−8.99, 5.02) in the rectangular coordinate.

Figure 5A:
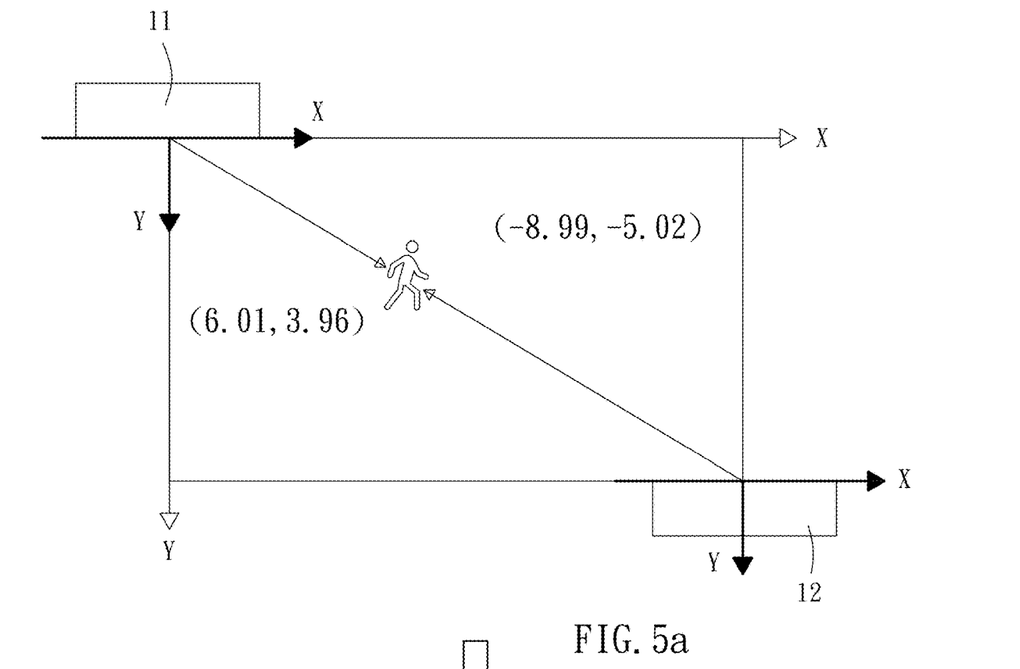
FIG. 5a is similar to FIG. 4b, with the polar coordinates converted to rectangular coordinates, wherein the X coordinate axis for the first radar and the Y coordinate axis of the second radar are axially reversed.
Figure 5B:
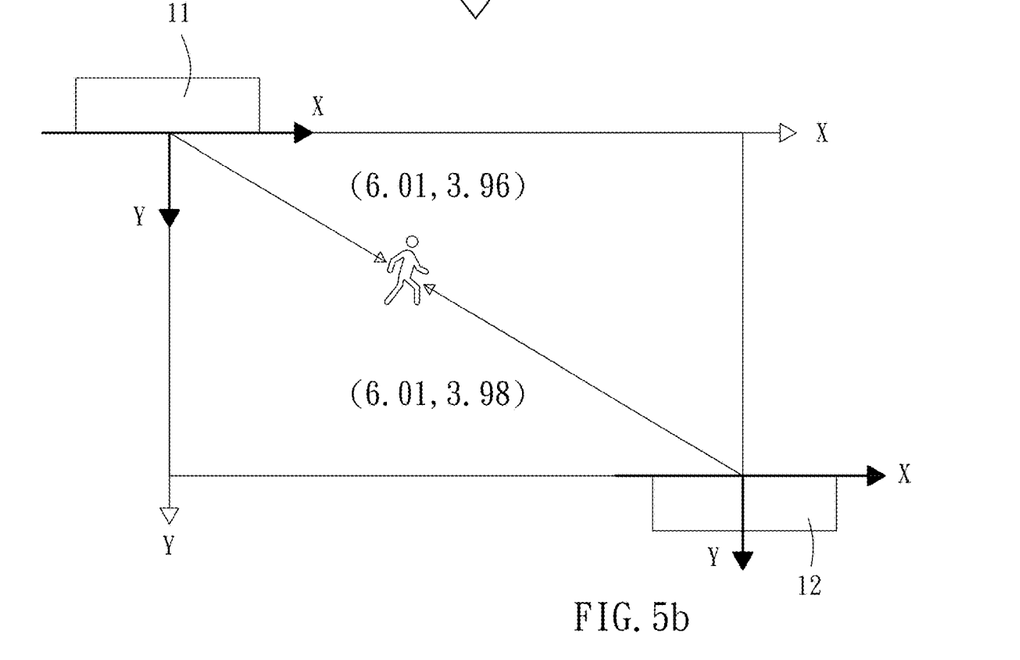
FIG. 5b is similar to FIG. 5a, with the coordinate value of the pedestrian calibrated.
Figure 6:
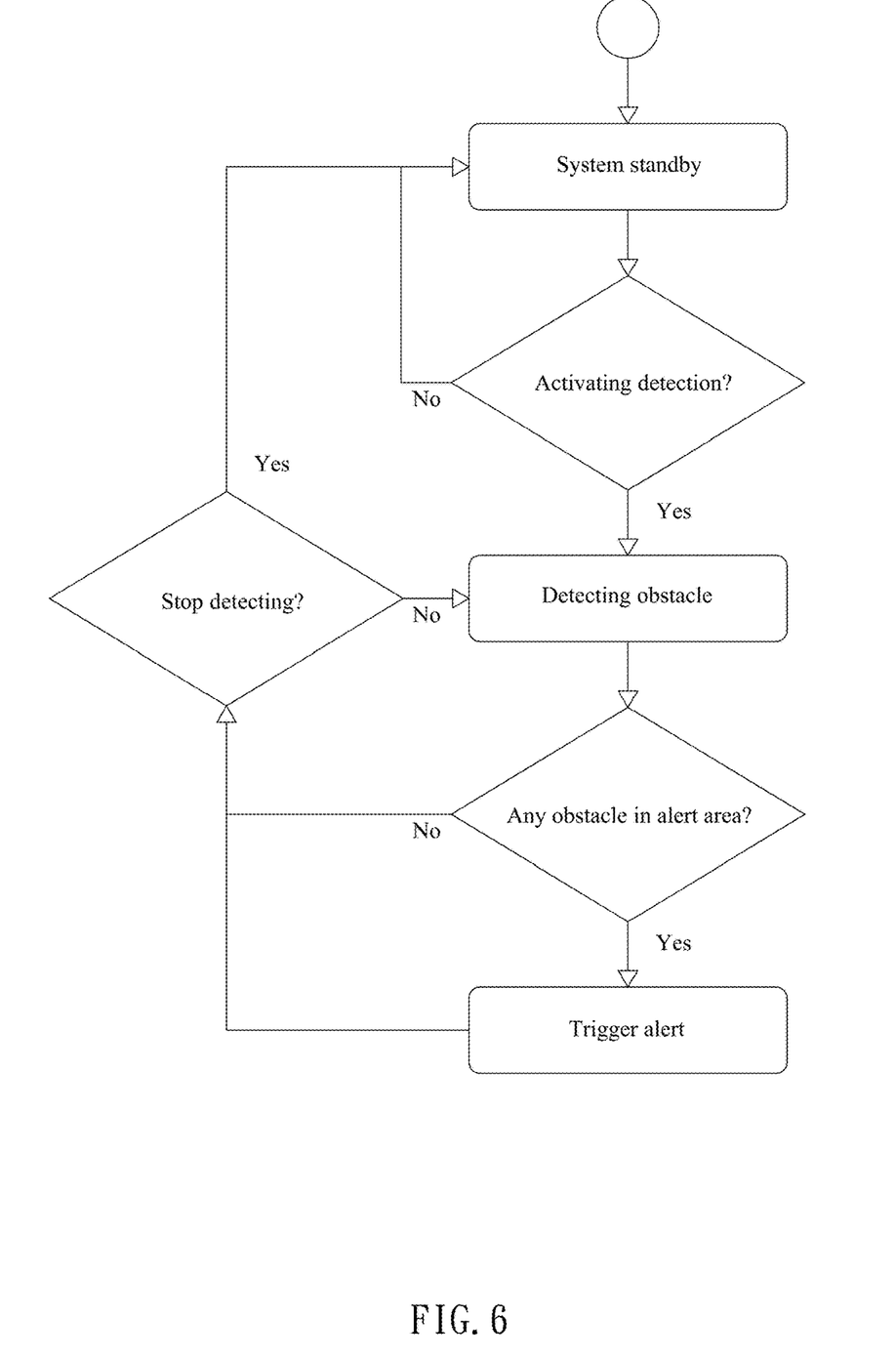
FIG. 6 is a flowchart of obstacle detection for a traffic control zone performed by the system of the first embodiment of the present invention.

According to the present embodiment, in the step of coordinate conversion 203, after normalization of the X and Y coordinate axes for the first radar 11 and the second radar 12, the first radar 11 and the second radar 12 make the same object they detect in the traffic control zone 300 approximately at the same coordinate point. In the present embodiment, the X coordinate axis for the first radar 11 is axially reversed. At this time, as shown in FIG. 5a, the X coordinate value of the first actual coordinate point turns from negative to positive, so the first actual coordinate point is (6.01, 3.96) in the rectangular coordinate system for the first radar 11. Similarly, the Y coordinate axis for the second radar 12 is axially reversed. At this time, as shown in FIG. 5a, the X coordinate value of the second actual coordinate point turns form positive to negative, so the second actual coordinate point is (−8.99, −5.02) in the rectangular coordinate system of the second radar 12. Further as shown in FIG. 5b, by subjecting the first actual coordinate point (6.01, 3.96) and the first initial coordinate point (0, 0) to an arithmetic operation of the X and Y coordinate values, a first reference coordinate point (6.01, 3.96) can be obtained. Similarly, by subjecting the second actual coordinate point (−8.99, −5.02) and the second initial coordinate point (15, 9) to an arithmetic operation of the X and Y coordinate values, a second reference coordinate point (6.01, 3.98) can be obtained. After the calibration as stated above, first reference coordinate point (6.01, 3.96) and second reference coordinate point (6.01, 3.98) are so close that they can be said to be approximately at the same coordinate point.

The step of alert-area setup 204 in the present embodiment follows the step of coordinate conversion 203, and involves defining an alert area 301 in the traffic control zone 300. The alert area 301 contains no excluded areas. In the present embodiment, an excluded area is defined in the traffic control zone 300 along a coordinate trajectory of a resident facility. As shown in FIG. 1, the resident facilities in the traffic control zone 300 include facilities usually provided at a grade crossing on the railway 400, such as boom barriers A, barrier arms B, emergency button machines C, and Jersey barriers D. The first radar 11 and the second radar 12 are installed besides the barrier arms B. In the present embodiment, receivers for radar waves are provided along the peripheries of the first radar 11, the second radar 12, the boom barriers A, the emergency button machines C, and some Jersey barriers D so as to define four first excluded areas 302 at the four corners of the traffic control zone 300. Further receivers for radar waves are provided along the barrier arms B so as to define four second excluded areas 303 in the traffic control zone 300 on the road 500. The alert area 301 includes anywhere in the traffic control zone 300 except for the first excluded areas 302 and the second excluded areas 303.

The step of determination and alert 205 follows the step of alert-area setup 204, and involves when the first radar 11 or the second radar 12 detects that there is a person in the alert area 301 and the person is identified by the alert processing unit 30 as an obstacle, triggering an alert. Referring to the flowchart of FIG. 6, when there is not a train running toward the traffic control zone 300, radar monitoring system 100 stays in its standby mode. When there is a train running toward the traffic control zone 300, the radar monitoring system 100 is signaled to activate detection and starts to scan the alert area 301 for any obstacle. When an obstacle is detected in the alert area 301, the radar monitoring system 100 sends a signal to trigger an alert. When the train leaves the traffic control zone 300, the radar monitoring system 100 is signaled again to stop scanning and then returns to its standby mode.

Figure 7:
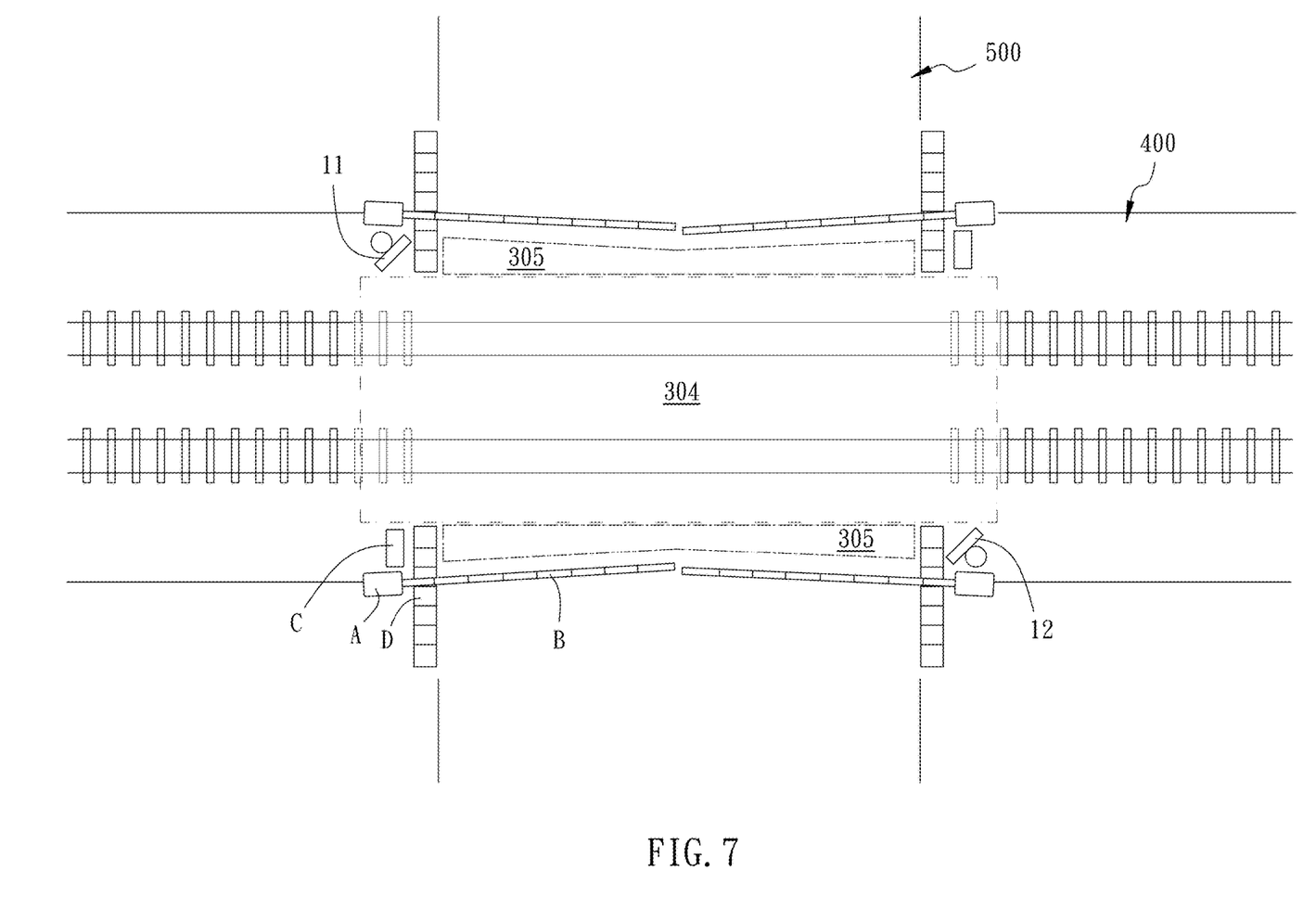
FIG. 7 is an applied view of the first embodiment of the present invention, showing that the alert area is divided into an urgent alert sub-area and two preliminary alert sub-areas.

In a preferred embodiment, the step of alert-area setup 204 may further comprise dividing the alert area 301 into at least one urgent alert sub-area and at least one preliminary alert sub-area. As shown in FIG. 7, the urgent alert sub-area is a region 304 in the alert area 301, and the preliminary alert sub-areas are regions 305 in the alert area 301. The region 304 is relatively central in the alert area 301 and close to the railway 400. The regions 305 are relatively peripheral in the alert area 301. When an object in the urgent alert sub-area 304 is determined as an obstacle, an alert is triggered to warn a driver of a train coming along the railway 400 to brake. When an object in the preliminary alert sub-area 305 is determined as an obstacle, an alert is triggered and then it is determined whether the obstacle is removed from the preliminary alert sub-area 305. If the obstacle has not been removed from the preliminary alert sub-area 305 after a predetermined time period (for example, 5 seconds after the alter is triggered), an alert is triggered to warn the driver of the train coming along the railway 400 to brake.

It is thus clear from the description of the foregoing embodiment that the present invention features for its use of axial normalization of the X and Y coordinate axes for the first radar 11 and the second radar 12, which makes the coordinate points of the same object identified by the first radar 11 and the second radar 12 identical or approximate, thereby enabling the first radar 11 and the second radar 12 to be backups for each other. Additionally, by dividing the traffic control zone 300 into the alert area 301 and the excluded areas (including the first excluded areas 302 and the second excluded areas 303), obstacles such as pedestrians, animals or other objects can be accurately differentiated from resident facilities such as the boom barriers A, the barrier arms B, the emergency button machines C, the Jersey barriers D, the first radar 11 and the second radar 12 as described previously and properly trigger alerts. The present invention thus provides accurate obstacle detection and automatic alerting despite any resident facility in the traffic control zone 300.

In addition to the applications of the radar monitoring system 100 and the radar monitoring method 200 of the first embodiment, the present invention may be embodied in alternative ways. For example, a second embodiment of the present invention is provided herein. In the second embodiment, the radar monitoring system 100 also comprises a radar detecting unit 10, a coordinate conversion unit 20, and an alert processing unit 30. The radar monitoring method 200 also involves installing the first radar 11 and the second radar 12 in a step of radar installation 201, performing axial normalization and calibration for the first radar 11 and the second radar 12 in steps angle offset 202 and coordinate conversion 203, so that the same object in the traffic control zone 300 is located by the first radar 11 and the second radar 12 at the same coordinate point, and defining the alert area 301 in a step of alert-area setup 204.

The present embodiment is different from the first embodiment in that there are two first radars 11 and two second radars 12 installed in the traffic control zone 300. Both of the two first radars 11 are installed at the same side of the railway 400, such as at the upper side of the railway 400 in FIG. 8, and both of the two second radars 12 are installed at the lower side of the railway 400 in FIG. 8. In the present embodiment, the first radar 11 and the second radar 12 installed at the same side of the road 500 are of the same set to work with each other. The first radar 11 and the second radar 12 of the same set emit radar waves in the same direction.

Figure 8:
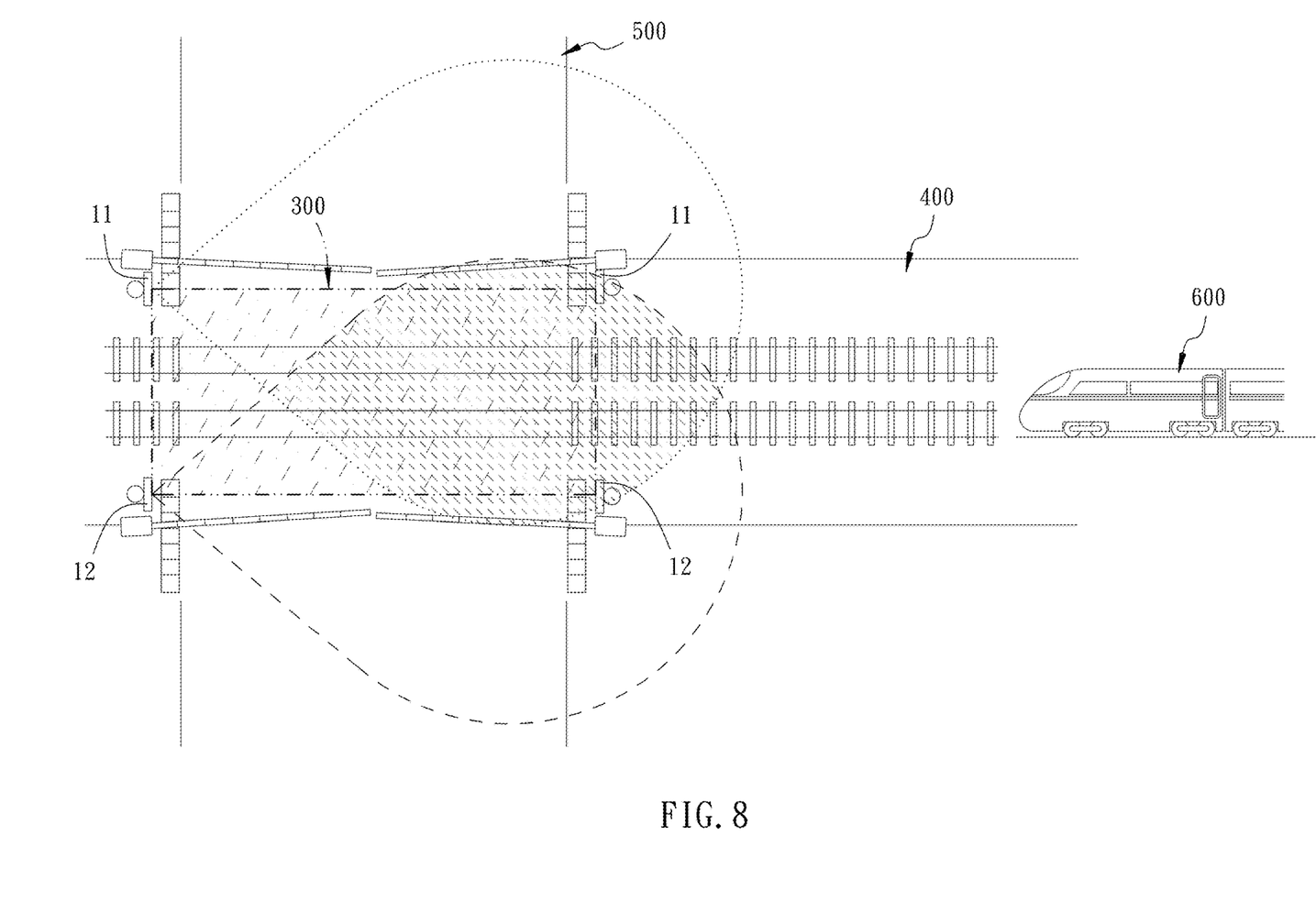
FIG. 8 is a radar monitoring system according to a second embodiment of the present invention, showing a first radar and a second radar installed in a traffic control zone at a grade crossing and parallel with each other, wherein the first and second radars use their short-range antenna modules to scan the traffic control zone.
Figure 9:
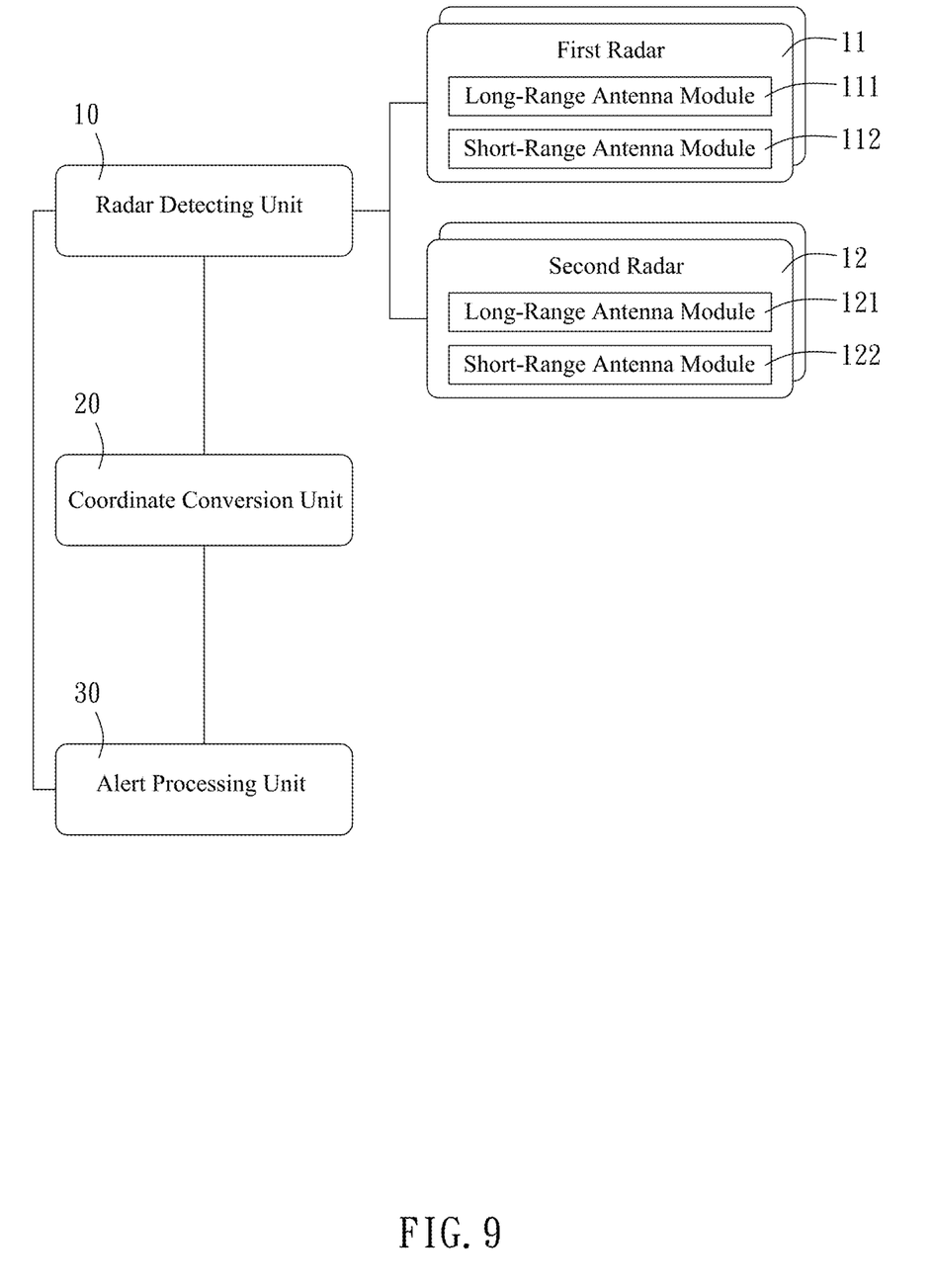
FIG. 9 is a block diagram of the radar monitoring system according to the second embodiment of the present invention.
Figure 10:
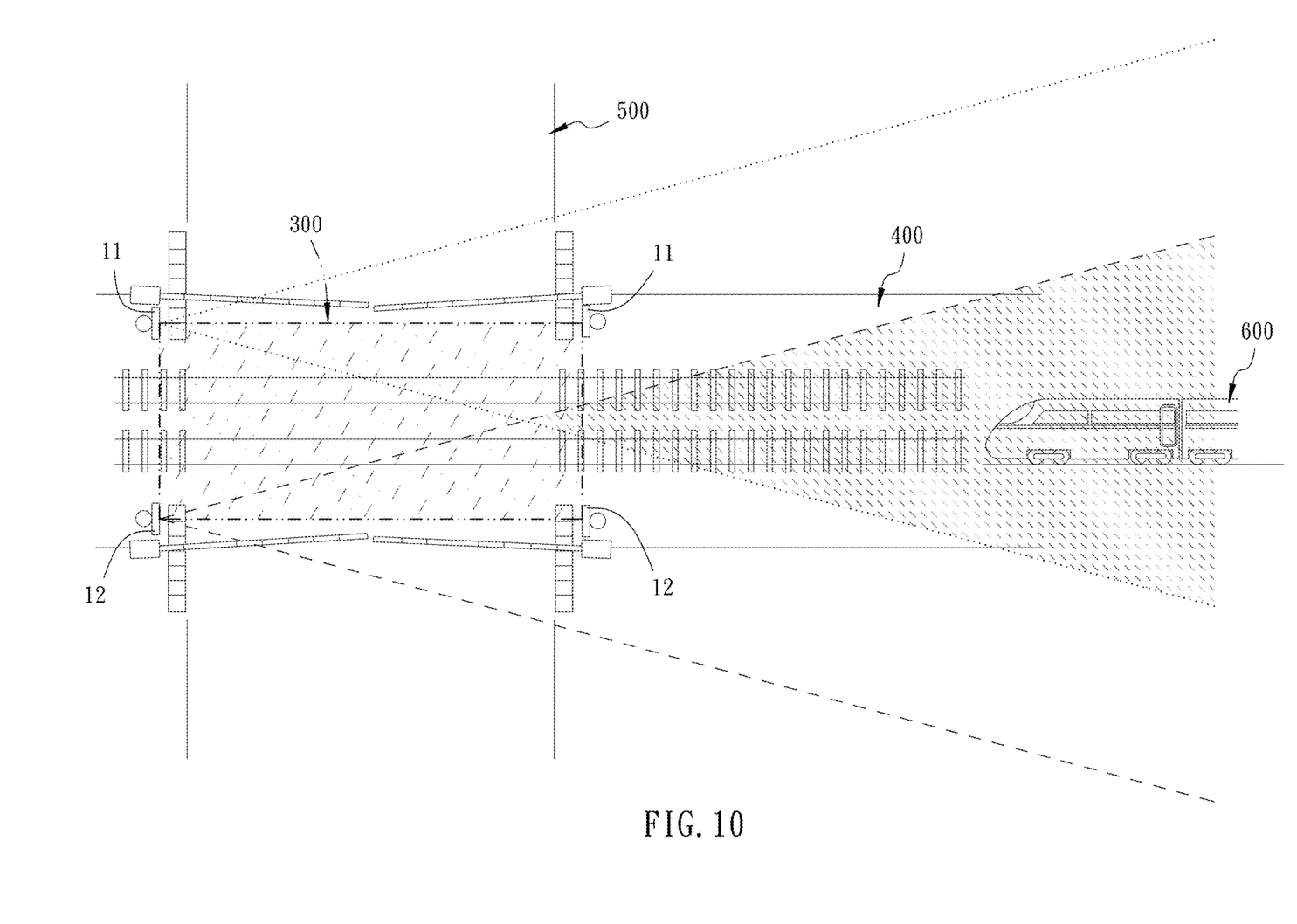
FIG. 10 is an applied view of the second embodiment of the present invention, showing that the first and second radars use their long-range antenna modules to scan the traffic control zone and detect a coming train.

As stated above, the two first radars 11 of the present embodiment each have a short-range antenna module 111 and a long-range antenna module 112, and the two second radars 12 each have a short-range antenna module 121 and a long-range antenna module 122 (as shown in FIG. 9). Therein, the short-range antenna modules 111, 121 emit radar waves to detect any obstacle in the alert area 301 (as shown in FIG. 8), and the long-range antenna modules 112, 122 emits radar waves to detect an approaching vehicle (which is a train in this case) outside and far away from the alert area 301 (as shown in FIG. 10). In the present embodiment, the first radar 11 and the second radar 12 use the short-range antenna modules 111, 121 to emit radar waves and serve as backups for each other, just like the first radar 11 and the second radar 12 each being a short-range radar as mentioned in the first embodiment.

Figure 11:
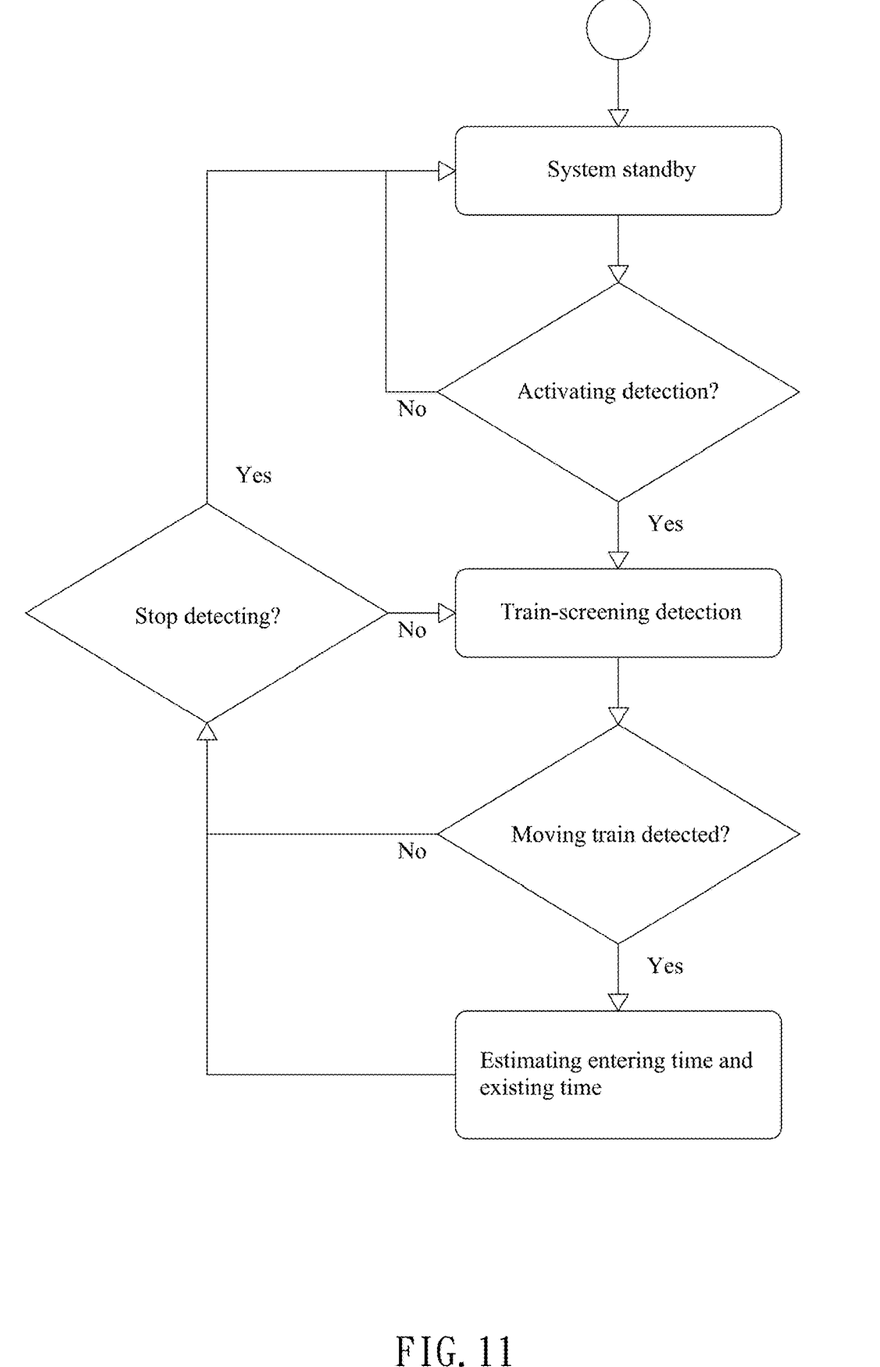
FIG. 11 is a flowchart of a train-screening detection function according to the second embodiment of the present invention.

The present embodiment is different from the first embodiment in the orientations and numbers of the first radars and the second radars 12, and the present embodiment additionally provides a train-screening detection function. As shown in the flowchart of FIG. 11, when there is a train 600 running along the railway 400 toward the alert area 301 from far away, the radar monitoring system 100 is signaled to activate detection. At this time, the set of the first radar 11 and the second radar 12 facing the train 600 uses the long-range antenna modules 112, 122 to detect the moving train 600, and estimate time points on which the train 600 enters and exits the alert area 301 according to a decreasing distance and a velocity of the train 600. Moreover, the set of first radar 11 and the second radar 12 that is back to the coming direction of the train 600 uses the long-range antenna modules 112, 122 to detect the leaving train 600, so as to confirm that the train 600 does exit the alert area 301. At this time, the radar monitoring system 100 is signaled to stop detecting and then the train-screening detection function is deactivated.

Figure 12:
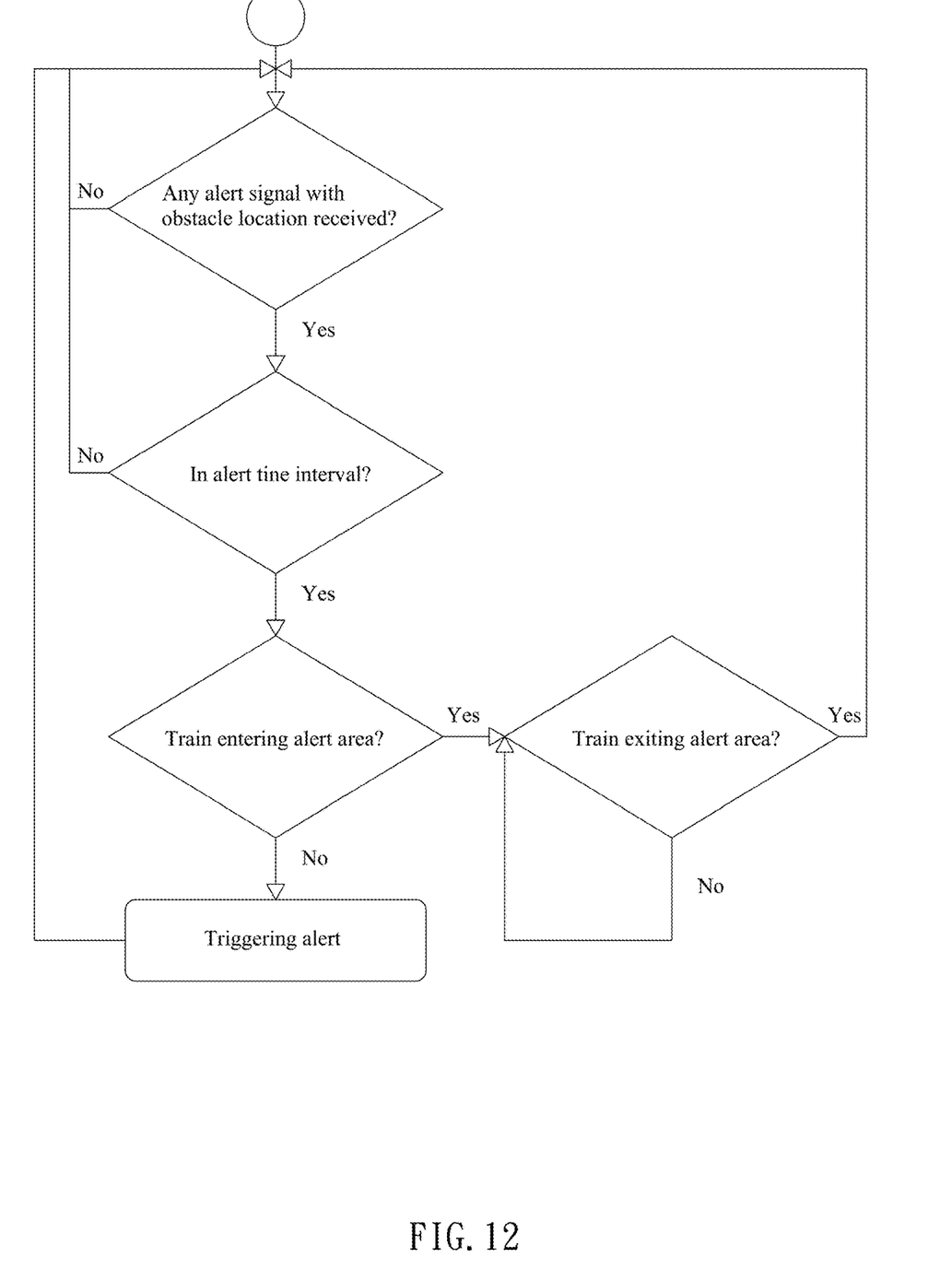
FIG. 12 is a flowchart of obstacle detection working with a train-screening detection function according to the second embodiment of the present invention.

According to the present embodiment, with the train-screening detection function activated, as shown in the flowchart of FIG. 12, if the first radar 11 and the second radar 12 detect an object in the traffic control zone 300 using the short-range antenna modules 111, 121, no alerts will be triggered even when the predetermined time period for triggering an alert has elapsed, because at this time the train 600 is not identified as an obstacle. To be specific, in the time interval between the train 600 entering and exiting the alert area 301, the alert processing unit 30 does not trigger an alert. Only before the train 600 enters the alert area 301 or after the train 600 exits the alert area 301, the alert processing unit 30 triggers an alert in response to an obstacle detected in the alert area 301.

Thereby, the present embodiment not only works as the first embodiment, but also provides information on whether the train 600 enters or exits the grade crossing without using a conventional axle counter. In other words, by virtue of the long-range antenna modules 112, 122, the first radar 11 and the second radar 12 can detect obstacles and provide the train-screening detection function.

What is claimed is:

1. A radar monitoring system for traffic control, being used to monitor a traffic control zone, the radar monitoring system comprising:
  a radar detecting unit, including a first radar and a second radar that are installed in or near the traffic control zone so as to emit radar waves covering the traffic control zone and serve as backups for each other, the first radar and the second radar each defining the traffic control zone using a coordinate system, and the traffic control zone containing an excluded area set around a resident facility;
  a coordinate conversion unit, being coupled to the radar detecting unit for converting the coordinate systems into rectangular coordinate systems, so that each of the first and second radars is able to locate any object in the traffic control zone at a coordinate point with respect to a set of X and Y coordinate axes, wherein the X and Y coordinate axes associated with the first radar and the second radar are subject to axial normalization, so that an identical object in the traffic control zone is located by the first radar and the second radar at approximately the same coordinate point; and
  an alert processing unit, being coupled to the radar detecting unit and the coordinate conversion unit, and linked to an alert area contained in the traffic control zone, so that when an object in the alert area is determined as an obstacle, the alert processing unit triggers an alert.

2. The radar monitoring system of claim 1, wherein the first radar and the second radar are each a short-range radar, and are such installed in or near the traffic control zone that they emit the radar waves in directions opposite to each other.

3. The radar monitoring system of claim 1, wherein the first radar and the second radar are such installed in or near the traffic control zone that they emit the radar waves in an identical direction.

4. The radar monitoring system of claim 3, wherein the first radar and the second radar each comprise a short-range antenna module that emits the radar waves to detect an obstacle in the alert area, and a long-range antenna module that emits the radar waves to detect a vehicle that is outside and approaching the alert area from far.

5. The radar monitoring system of claim 1, wherein the alert processing unit further divides the alert area into an urgent alert sub-area and a preliminary alert sub-area, in which the urgent alert sub-area is relatively central in the alert area and the preliminary alert sub-area is relatively peripheral in the alert area.

6. A radar monitoring method for traffic control, being used to monitor a traffic control zone, the radar monitoring method comprising steps of:
- radar installation: installing a first radar and a second radar in or near the traffic control zone so that the first and second radars emit radar waves covering the traffic control zone and serve as backups for each other, the first radar and the second radar each defining the traffic control zone using a coordinate system, and the traffic control zone containing an excluded area set around a resident facility;
- coordinate conversion: converting the coordinate systems into rectangular coordinate systems, so that each of the first and second radars is able to locate any object in the traffic control zone at a coordinate point with respect to a set of X and Y coordinate axes, wherein the X and Y coordinate axes associated with the first radar and the second radar are subject to axial normalization, so that an identical object in the traffic control zone is located by the first radar and the second radar at approximately the same coordinate point;
- alert-area setup: defining an alert area in the traffic control zone; and
- determination and alert: when an object in the alert area is determined as an obstacle, triggering an alert.

7. The radar monitoring method of claim 6, wherein in the step of coordinate conversion involves: defining a first initial coordinate point for the first radar and defining a second initial coordinate point for the second radar; using the first radar to detect an object to obtain a first actual coordinate point, and using the second radar to detect the same object to obtain a second actual coordinate point; reversing at least one of the X coordinate axis and the Y coordinate axis of the first radar and/or the second radar for performing the axial normalization; then obtaining a first reference coordinate point by subjecting the first actual coordinate point and the first initial coordinate point to an arithmetic operation of X and Y coordinate values and obtaining a second reference coordinate point by subjecting the second actual coordinate point and the second initial coordinate point to an arithmetic operation of X and Y coordinate values; and making the first reference coordinate point and the second reference coordinate point be approximately the same coordinate point.

8. The radar monitoring method of claim 7, further comprising a step of angle offset before the coordinate systems are converted into the rectangular coordinate systems, wherein the step of angle offset involves offsetting an angle of arrival of each of the first radar and the second radar, so that the coordinate axes of the first radar and the second radar are aligned with the respective X and Y coordinate axes.

9. The radar monitoring method of claim 6, wherein in the step of the alert-area setup, the excluded area is defined along a coordinate trajectory of the resident facility in the traffic control zone.

10. The radar monitoring method of claim 6, wherein the first radar and the second radar are each a short-range radar, in which the first radar and the second radar are such installed in or near the traffic control zone that they emit the radar waves in directions opposite to each other to detect an obstacle in the alert area.

11. The radar monitoring method of claim 6, wherein the first radar and the second radar each comprise a short-range antenna module and a long-range antenna module, in which the first radar and the second radar are such installed in or near the traffic control zone that they emit the radar waves in an identical direction, and the first radar and the second radar each use the short-range antenna module to emit the radar waves to detect an obstacle in the alert area, and use the long-range antenna module to emit the radar waves to detect a vehicle that is outside and approaching the alert area from far.

12. The radar monitoring method of claim 11, wherein the traffic control zone is at a grade crossing that is an intersection between a railway and a road, and the first radar and the second radar each use the long-range antenna module to detect a train coming along the railway to the alert area, and estimate time points on which the train enters and exits the alert area according to a decreasing distance and a velocity of the train, so as to activate a train-screening detection function at the time point when the train enters the alert area to prevent the train from being determined as an obstacle, and deactivate the train-screening detection function when the train exits the alert area.

13. The radar monitoring method of claim 6, wherein the traffic control zone is at a grade crossing that is an intersection between a railway and a road, and the step of alert-area setup further involves dividing the alert area into an urgent alert sub-area and a preliminary alert sub-area, in which the urgent alert sub-area is relatively central in the alert area and the preliminary alert sub-area is relatively peripheral in the alert area, and wherein the method comprises: when an object in the urgent alert sub-area is determined as an obstacle, triggering an alert to warn a driver of a train coming along the railway to brake; and when an object in the preliminary alert sub-area is determined as an obstacle, triggering an alert and then determining whether the obstacle is removed from the preliminary alert sub-area; and if the obstacle has not been removed from the preliminary alert sub-area after a predetermined time period, triggering an alert to warn the driver to brake the train.

* * * * *